July 7, 1953 H. BEHRINGER 2,644,439
CHANGE SPEED AND STARTING GEARING FOR MOTORCYCLES
Filed Dec. 1, 1949
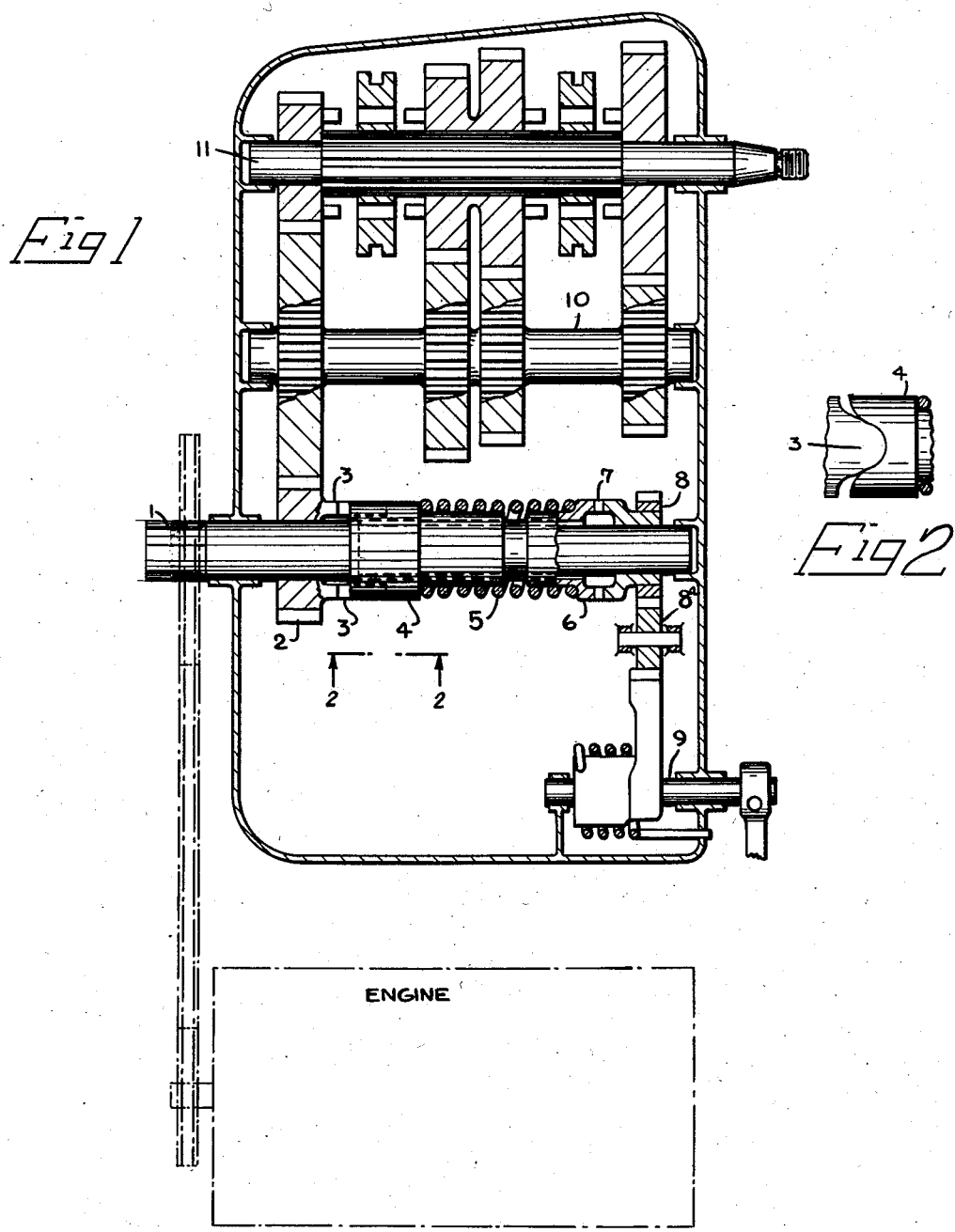
INVENTOR.
HERMANN BEHRINGER
BY
Dicke & Padlon
ATTORNEYS Patented July 7, 1953

2,644,439

UNITED STATES PATENT OFFICE 2,644,439

CHANGE SPEED AND STARTING GEARING FOR MOTORCYCLES

Hermann Behringer, Munich, Germany, assignor to Bayerische Motoren Werke AG., Munich, Germany, a corporation of Germany Application December 1, 1949, Serial No. 130,431
In Germany December 27, 1948

3 Claims. (Cl. 123—185)

The present invention relates to a change speed gear for motorcycles and more particularly to those in which the crankshaft and the drive shaft of the rear wheel are arranged longitudinally in the direction of drive, the power transmission being effected from the drive shaft through an intermediate shaft, each pair of gears being in constant mesh. Simultaneously a gear on the intermediate shaft together with a pinion mounted on the drive shaft serves as an intermediate gearing for the transmission of power from the drive shaft. It is convenient in this case to design the gear unit so as to arrange the drive shaft, the intermediate shaft, and the driven shaft parallel with the direction of drive and to effect shifting of all speeds on the driven shaft and furthermore to arrange the kickstarter shaft in an axis parallel with and spaced from the other shafts of the gear unit.

In motorcycle engines in which the crankshaft is arranged transversely to the longitudinal axis and in which power is transmitted by means of a chain from the crankshaft to the gearing, it is already known to drive the sprocket wheel mounted on the crankshaft by means of a spring loaded shock absorbing coupling in order to damp the shocks occurring between engine and rear wheel.

The application of such shock absorbing couplings in engines having the crankshaft arranged longitudinally in the direction of drive hitherto met with considerable difficulties as to their installation.

In a gearing of the type initially described it is now possible according to the present invention to arrange a shock absorbing coupling of known type on the drive shaft of the gear unit. The invention proposes for this purpose to provide on the pinion rotatably mounted on the drive shaft two uniformly designed opposite cams which engage a cam piece capable of being displaced on the drive shaft in a keyway thereon and positively rotating therewith, a compression spring being provided to force the cam piece against the cams provided on the driving pinion.

The amount of possible axial displacement of the positively rotating cam piece on the drive shaft will be determined by the length of the compression spring in its compressed state. In connection with the contour of the cams and of the cam piece respectively, the possible angle of rotation between the cams and the cam piece must be such as to keep the cams even with the greatest possible axial displacement of the cam piece within the provided face on the latter.

Furthermore provision is made in the present invention so that the torque impulses from the kickstarter shaft, which is arranged in parallel relation with the other shafts of the gear unit, are transmitted through intermediate gears and a unidirectionally effective tooth system directly to the drive shaft of the gearing. According to the invention the driven part of said tooth system is provided on a bush mounted in a keyway of the drive shaft and positively rotating therewith, said bush being so designed that it may simultaneously serve as an abutment collar for the compression spring.

The improvement proposed by the invention therefore permits on the one hand an advantageous design of the present gear unit of motorcycle engines with the crankshaft arranged in the direction of drive and shaft drive of the rear wheel, and on the other hand the installation in the space available of a shock absorbing device of known type for damping the shocks between engine and rear wheel in a simple and effective manner.

Reference is made now to the accompanying drawing in which Fig. 1 is a section through the gearing showing the arrangement of the shock absorber on the drive shaft according to the invention, and Fig. 2 is a detail direction of arrows of 2—2 in Fig. 1.

Rotatably mounted on the drive shaft 1 is a pinion 2 which is provided with two cams 3 engaging a cam piece 4. The cam piece 4 is mounted on the drive shaft 1 for being positively rotated therewith by means of a keyway connection in which it is longitudinally slidable. A compression spring 5 acts with one end against the cam piece 4 forcing it against the cams 3, while at its opposite end it abuts a collar bush 6 likewise secured to the keyway of the shaft 1. The collar 6 simultaneously carries a unidirectionally effective toothing 7 which is driven by a corresponding toothing through intermediate wheels 8 and 8a from the kickstarter shaft 9. Power is transmitted from the pinion 2 on the drive shaft 1 to the intermediate shaft 10 and from there to the driven shaft 11 on which simultaneously the different speeds are shifted.

I claim:

1. In a change speed gear for motorcycles having its crankshaft arranged longitudinally in the direction of drive, drive means for the rear wheel of the motorcycle for transmitting power, intermediate shaft gear meshing means in connection with the drive means, and driven shaft gear means, the combination of a drive shaft for effecting power transmission, said drive shaft having a keyway thereon, a pinion rotatably mounted on said drive shaft for constant meshing with said gear meshing means, a pair of uniformly designed opposite cams on said pinion, a cam piece engaging said cams, said cam piece being mounted on the drive shaft in said keyway, thereon permitting axial displacement of said cam piece on said drive shaft and providing a connection between said cam piece and said drive shaft for positive rotation, a compression spring engaging said cam piece to force it against the cams provided on the driving pinion, the possibility of axial displacement of said cam piece on the drive shaft being determined by the length of the compression spring in its compressed state, gear coupling means engaging said spring at its other end, connecting means for said coupling means, intermediate gear means in connection with said coupling means, and kick-starter means in powered parallel relation with the drive shaft and in connection with the intermediate gear means for transmitting torque impulses from said kick-starting means to said shaft.

2. In a motorcycle, wherein the engine crankshaft thereof is arranged in parallel relationship with the longitudinal axis of the vehicle and the engine power is transmitted to the rear wheel by means of a shaft drive, a change speed gear comprising an input shaft, an intermediate layshaft, and an output shaft, all of said shafts being in spaced parallel relationship with each other, a plurality of constantly meshing pairs of gears on said two last named shafts, said gears being arranged for selective operation to transmit torque at a plurality of different speed ratios, a pinion rotatably mounted on said input shaft for constantly meshing with one of the wheels on said layshaft, means for elastically coupling said pinion with said input shaft, said last means including a plurality of cams formed integrally with said pinion and extending substantially in the same direction in which power from the engine is introduced into the gear unit, a cam piece axially displaceable on the input shaft but positively rotating therewith adapted to cooperate with said plurality of cams, a collar bush mounted for rotation with the input shaft opposed to said cam piece, a compression spring member around said input shaft intermediate said cam piece and said collar bush and forcing said cam piece against said cams on the pinion, the maximum axial displacement of the cam piece on its shaft being determined by the maximum axial compressibility of said compression spring member but smaller than the maximum possible stroke between the cams on the pinion and the cam piece.

3. In a change speed gear as claimed in claim 2, kick-starting means in powered parallel relation with said input shaft, said kick-starting means comprising a tensioned kick-starter shaft arranged in spaced parallel axial relation with said input shaft, a toothed segment on said kick-starter shaft, an intermediate axle, an intermediate gear on said axle in constant mesh with said toothed segment, a gear rigidly mounted on the input shaft and constantly engaging said intermediate gear, unidirectional coupling means adapted to transmit torque impulses from said kick-starter shaft to said input shaft and arranged between said gear on the input shaft and said collar bush, said coupling means including a first coupling member integral with said gear and a second opposed coupling member formed integral with said collar bush.

HERMANN BEHRINGER.

References Cited in the file of this patent

UNITED STATES PATENTS

| Number | Name | Date |
|---|---|---|
| 757,805 | Ford-Smith et al. | Apr. 19, 1904 |
| 941,034 | Parker | Nov. 23, 1909 |
| 2,375,020 | Mitchell | May 1, 1945 |
| 2,446,854 | Schroeder | Aug. 10, 1948 |
| 2,448,872 | Eaton | Sept. 7, 1948 |

FOREIGN PATENTS

| Number | Country | Date |
|---|---|---|
| 360,904 | Germany | Oct. 7, 1922 |
| 379,313 | Italy | Mar. 21, 1940 |
| 554,346 | France | Feb. 28, 1923 |
| 676,025 | France | Feb. 18, 1930 |